A. H. AARON & E. A. TEETER.
COMBINED FENDER, ABSORBER, AND BRAKE SET FOR AUTOMOBILES.
APPLICATION FILED MAY 2, 1916.
1,246,372.
Patented Nov. 13, 1917.
2 SHEETS—SHEET 2.
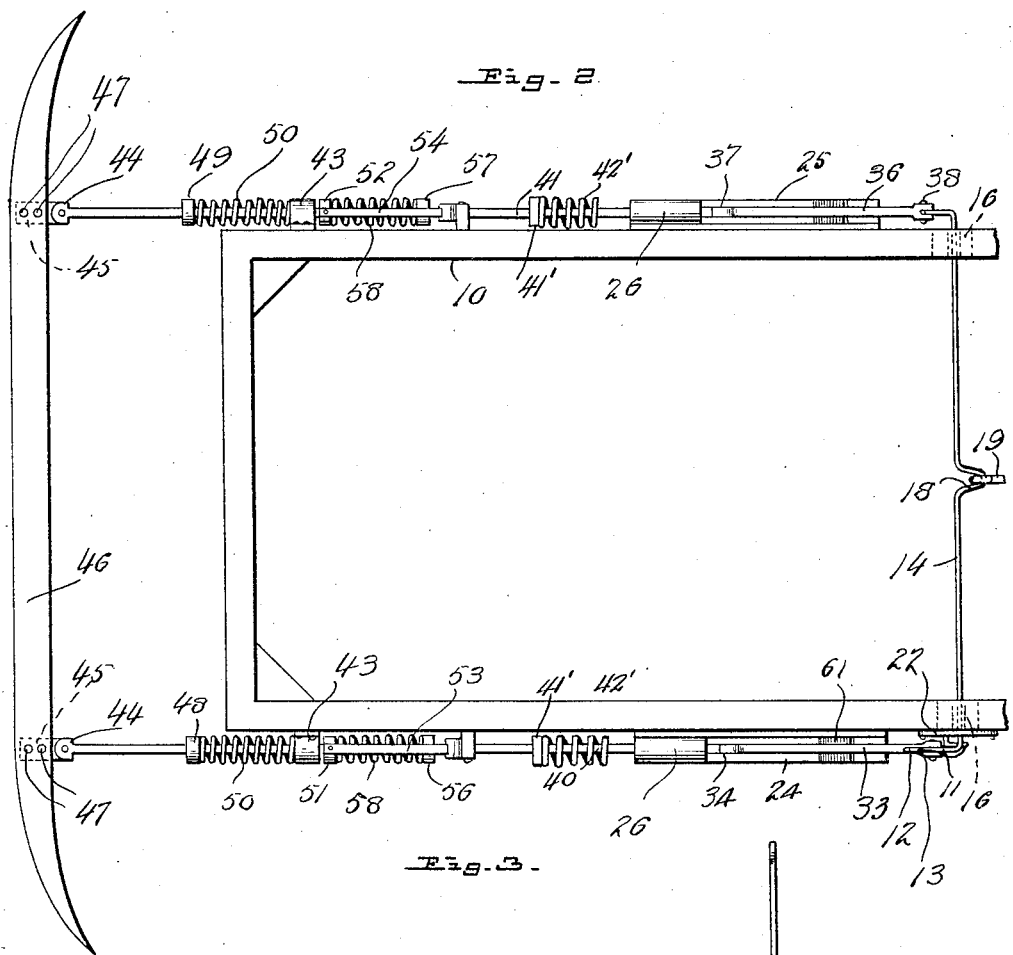
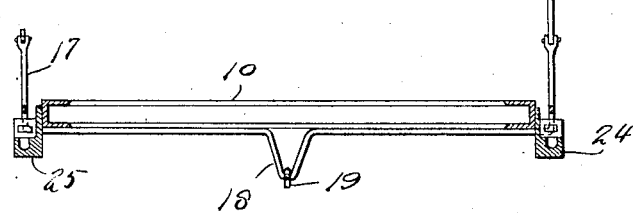

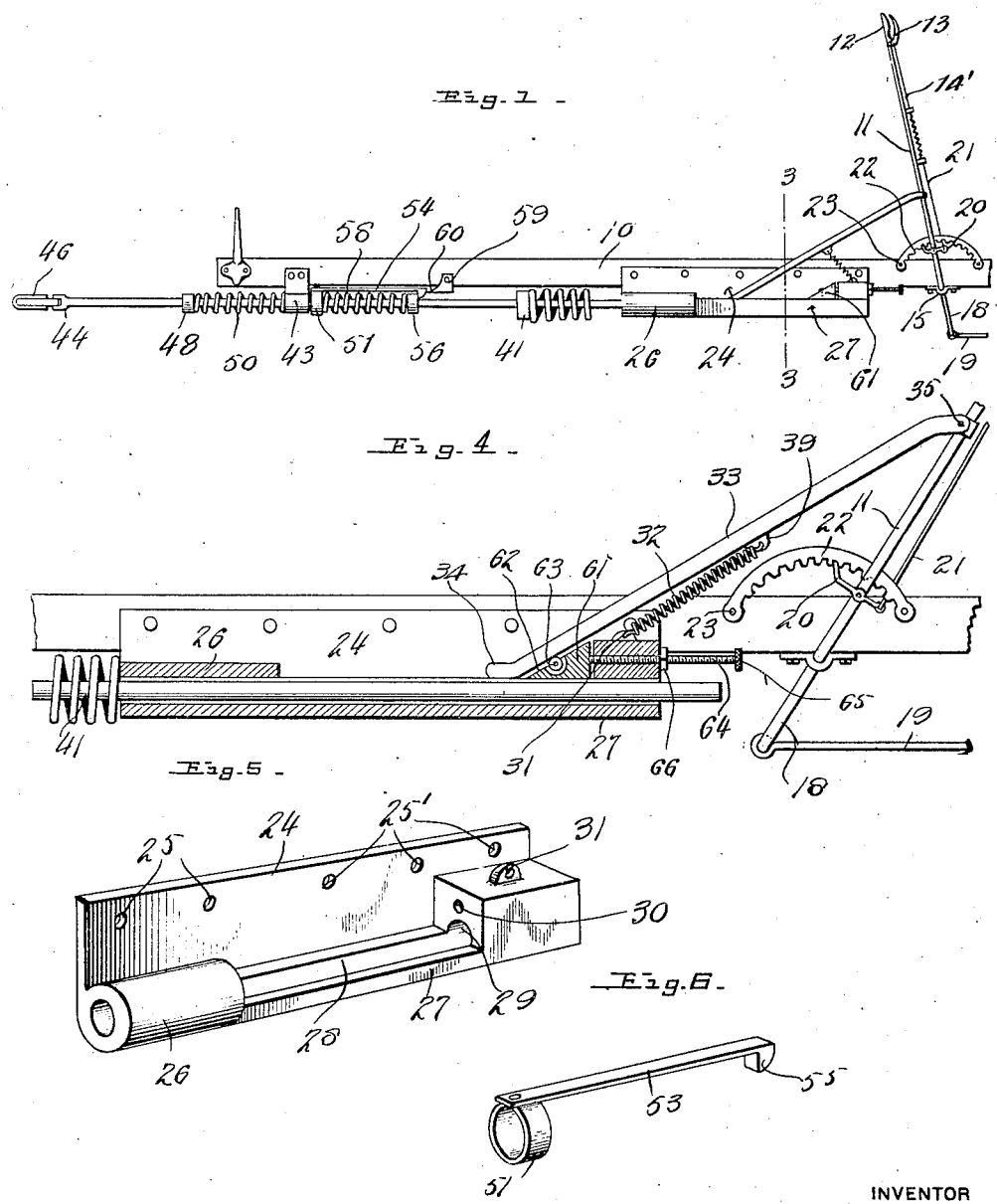

UNITED STATES PATENT OFFICE.

ARTHUR H. AARON AND EDGAR A. TEETER, OF FRANKLIN, PENNSYLVANIA.

COMBINED FENDER, ABSORBER, AND BRAKE-SET FOR AUTOMOBILES.

1,246,372.

Specification of Letters Patent.

Patented Nov. 13, 1917.

Application filed May 2, 1916. Serial No. 94,937.

*To all whom it may concern:*

Be it known that we, ARTHUR H. AARON and EDGAR A. TEETER, citizens of the United States, residing at Franklin, in the county of Venango and State of Pennsylvania, have invented certain new and useful Improvements in a Combined Fender, Absorber, and Brake-Set for Automobiles, of which the following is a specification.

This invention has relation to certain improvements in fenders and shock absorbing devices, for automobiles and it contemplates, primarily, the provision of a novel fender structure, which aside from embodying all of the necessary requisites of a device of that nature, also performs in the capacity, of, first, an automatic brake set, and second, as a shock absorber.

The device is adapted to be attached to the front of an automobile, it being somewhat similar in appearance to the ordinary guard rail or fender now in use, and aside from containing all of the qualities of the ordinary fender, it presents other qualities of greater importance to the occupant of the car, namely, the power to automatically control the brake clutch, thus removing the pressure from the rear caused by the car being forced ahead, throw on the brake at the same time thus helping to overcome the momentum of the car, and lastly, to act as a cushion and absorb the jar which would be caused by the greatly reduced momentum, by virtue of powerful springs, or other shock absorbing means which come into play at the proper instant during operation.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in side elevation showing the frame structure of an automobile with the device of our invention, in its preferred embodiment, in conjunction therewith and in operative relation.

Fig. 2 is a view in plan illustrating more clearly the relative position of the several parts.

Fig. 3 is a view in section taken on line 3—3 of Fig. 1.

Fig. 4 is a detail view showing the brake clutch actuating lever in a set position, after being moved to that position, through the instrumentality of the fender structure.

Fig. 5 is a view in perspective of an improved bracket that is employed in conjunction with our invention.

Fig. 6 is a view in perspective showing a detail that is also employed.

In the drawings, 10 designates a portion of the frame work of an automobile, which may be of any desired type or construction and which does not, necessarily, have to be fashioned in a peculiar manner in order to support our invention. In conjunction with the frame work 10, we have shown a rockably mounted controlling lever 11 that is equipped with a handle portion 12 at its upper end, said lever being further provided with a pivoted hand grip 13 in juxtaposed relation to the handle 12, just mentioned, the hand grip carrying a depending actuating cable 14′, as clearly shown in Fig. 1. Actuating or controlling lever 11 is bent at a suitable point adjacent its lower end and includes the rod or crank-s ft 14 (Fig. 2) journaled through pivot bearings 15 and 16, carried upon frame 10. At the side of the frame 10 that carries the bearing 16, the crank-shaft 14 is formed with a crank arm 17, as shown in Figs. 2 and 3. Intermediate the sides of frame 10, the crank-shaft 14 is bent to form a crank portion 18, which part has connection with the brake setting and releasing device (not shown) through the medium of a link 19. As will be noted upon reference to Fig. 1, lever 11 carries a pivotally mounted pawl 20, actuatable by means of the cable 14′ that is attached to the pivoted hand grip 13 and which coöperates with a segmental rack 22 that is suitably positioned on the frame 10, adjacent the actuating lever 11, as at 23. Consequently, it will be seen that the actuating arm of lever 11 may be swung to any desired position with respect to rack 22 and that the crank 18 and the upstanding arm of finger 17 will be likewise operated.

Adjacent lever 11 and upstanding finger or arm 17, we position upon frame 10, complemental brackets 24 and 25 but by reason of their complemental construction, only one will be described in detail and thus, we may now refer to the showing in Fig. 5. This bracket has provided throughout its length, a series of apertures 25' that may receive suitable fastening members whereby the bracket may be positioned in place and is further equipped with longitudinally extending sleeves 26, at one end, and an outstanding enlargement 27 that extends the remainder of its longitudinal extent. Enlargement 27 is cut away adjacent the sleeve 26 and the cut away portion provided with a suitable way 28 flush with the lower wall of the interior bore of sleeve 26 and likewise positioned with respect to the longitudinal bore 29 of the enlargement. Just above the bore 29, enlargement 27 is provided with an interiorly screw threaded bore 30, that serves the purpose subsequently set forth, and said enlargement is further equipped with a bearing 31 to which is attached one end of the contractile or retractile spring 32.

Trip lever or connection 33 has one end bent to form a foot 34 which operates between the sleeve 26 and enlargement 27, as shown in Fig. 4, the upper end of the trip lever 33 being pivotally connected at 35 with the lever 11, before mentioned. On the other hand, enlargement 27 of bracket 25, carries a retractile spring that connects with a like trip lever 36, whose foot portion 37 operates similar to the foot portion 34, of the lever 33, the upper end of this trip lever being connected as at 38 with the upper free end of the finger or arm 17. As clearly shown in Fig. 4, the retractile spring 32 also connects with trip lever 33, as at 39, whereby movement of the same relative to the enlargement is resisted.

Carrying rods 40 and 41 operate slidably through the bores of the sleeve 26 and enlargement 37, as clearly shown in Fig. 4 and also operate through other supporting bearings 43 that are arranged near the forward end of the frame 10. At their outer ends, rods 40 and 41 are slightly enlarged and bifurcated as at 44 Figs. 1 and 2, in order to accommodate and properly support a fender or buffer member 46; the latter being provided with connection-plates 45 secured in place to the buffer member or cross-bar 46, as at 47, and pivotally connected to the bifurcated ends 44 of the rods 40 and 41. Rods 40 and 41, preferably carry fixed collars 48 and 49 respectively between which and the bearings 43, are interposed expansion springs 50 of a light duty type which serve to yieldingly resist rearward movement of the fender or buffer member 46.

Rearwardly of the bearings 43, rods 40 and 41 carry movable bearings 51 and 52, to which are connected rearwardly directed spring arms 53 and 54, the latter having their free ends provided with retaining lugs 55. Collars 56 and 57 are fixed on rods 40 and 41 and they carry coil springs 58 that bear against the movable collars 51 and 52; the purpose of coil springs being to direct the rods 40 and 41 rearwardly, when released, and thus cause the quick setting of the brake mechanism. When the movable collars or bearings 51 and 52 are in the position shown in Fig. 1, and the retaining lugs 55 engage with the fixed collars, it will be seen that the springs 58 will be held in a compressed position.

At suitable points throughout the length of the side members 10 of the frame, we provide oppositely alined trips 59 which are designed to coact with the free ends of the spring arms 53 during operation of the device so as to withdraw lugs 55 from engagement with the fixed collars 56 and 57 to release the movable collars and permit the springs to come into operation to force the rods 40 and 41 rearwardly. These trips may be of any desired configuration but are preferably of that form shown in detail in Fig. 1, having an extended lip 60 whereby a more effectual actuation of the lugs 55 may be obtained.

The rods 40 and 41 also carry fixed stops 41', the latter having connected therewith heavy duty shock absorbing springs 42'. When the parts are in the position shown in Fig. 1, the heavy duty springs 42' lie in spaced relation to the forward end of the brackets 24 and they remain out of engagement therewith until after the setting of the brake mechanism. When the springs engage with the brackets, however, they effectually resist further rearward movement of the fender member, and thus serve an efficient shock absorbing means.

With a view of providing means whereby the time of actuation or release, of the trip levers 33 and 36 may be regulated, we provide the intermediate portion of enlargements 27 of brackets 24 and 25 with slidable blocks 61 that have beveled faces 62 opposed to the rear face of the trip levers, as clearly shown in Fig. 4. Upon the beveled face 62 of the block is carried one or more anti-friction rollers 63 whereby the engagement with the blocks will not serve to retard movement of the trip levers in any way. In order to adjust the blocks 61 we position through the screw threaded bores 30 of the bearings, suitable threaded rods 64 which connect at their inner end with the blocks and carry suitably milled head portions at their outer ends, whereby they may be conveniently manipulated. We may further provide the rods with a movable nut or stop member 66, as shown in Fig. 4, but this feature is not absolutely necessary.

The operation of our invention is substantially as follows:—

The foot portions 34 and 37 of the trip levers normally rest within the ways 28 of the intermediate portion of the enlargement 27 of the bracket immediately adjacent the sleeve 26, the rear ends of rods 40 and 41 being in engagement with the forward end of the foot members, as is obvious. Consequently, upon colliding with an object the fender or buffer member 46 is moved rearwardly with respect to the frame 10 against the tension of the light duty springs 50, while the rods 40 and 41, serve to move the trip levers rearwardly and thus actuate both the operating lever 11 and the rod 14 until the brake mechanism is automatically set. After the trip levers have been moved a sufficient distance in order to effect the setting of the brake mechanism, they come into contact with rollers 63 on the blocks 61 and are thereby slightly raised out of the ways 28 in order to permit the rods 40 and 41 to be moved rearwardly independent thereof.

The slight rearward movement of the rods 40 and 41 causes the retaining lugs 55 to be withdrawn from engagement with the fixed collars 56 and 57 whereby the springs 58 will immediately expand and cause the rods to move rearwardly with a sudden thrust to effectually actuate the brake setting mechanism. Then, after the brake mechanism is set the heavy duty springs 42' are brought into operation and effectually cushion the fender member.

From the foregoing, it is apparent that the device disclosed performs three particular functions and serves in three independent capacities, namely, as a fender or buffer, as an efficient shock absorber, and as means to automatically set the brake mechanism of the automobile. In view of the fact that the advantages and novel features of the invention appear to be apparent from the foregoing, it is believed that further detail description is deemed unnecessary.

In reducing our invention to practice, we find that the form referred to herein as the most practical and preferred embodiment is the most efficient, but realizing that certain conditions will necessarily vary in concurrence with the adoption of our device, we desire to emphasize the fact that various minor changes in the details of construction and in the proportion of parts may be resorted to when required without sacrificing any of the advantages of our invention, as defined in the appended claims.

Having thus fully described our invention, what we claim as new and desire to secure by Letters Patent is:—

1. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, and means for breaking the operative relation of said rod relative to said connection and allowing said rod to continue its movement independently of said connection.

2. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, means for breaking the operative relation of said rod relative to said connection and allowing said rod to continue its movement independently of said connection, and means for adjusting the last said means so as to time the breaking of said operative relation.

3. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, means for breaking the operative relation of said rod relative to said connection and allowing said rod to continue its movement independently of said connection, and means for accelerating the rearward movement of said rod.

4. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, means for retarding the initial movement of said rod, means for overpowering the first said means and accelerating movement of said rod, and means for breaking the operative relation of said rod relative to said connection and allowing said rod to continue its movement independently of said connection.

5. In a device of the character described, the combination with an automobile including a brake setting lever, of brackets positioned on said automobile adjacent said brake setting lever, tripping levers associated with said brake setting lever and having their free ends normally resting on said brackets, a fender member disposed forwardly of said automobile, rods supporting said fender member and having their rear ends normally engaging the free ends of said trip levers, whereby upon rearward movement of said rods, said brake setting lever will be operated, and means to automatically disengage said trip levers from said rods, as and for the purpose specified.

6. In a device of the character described, the combination with an automobile including a brake setting lever, of trip levers to actuate said brake setting lever, brackets positioned on said automobile adjacent said brake setting lever and normally supporting the free ends of said trip levers, a fender member disposed forwardly of said automobile, rods supporting said fender member and having their rear ends normally engaging the free ends of said trip levers whereby upon rearward movement of said rods, said trip levers will be operated to actuate said brake setting lever, means to automatically disengage said trip levers and said rods, means to yieldingly resist rearward movement of said fender member, and normally inoperative means automatically becoming operative upon movement of said rods to a certain position to suddenly thrust said rods rearward.

7. In a device of the character described, the combination with an automobile including a brake setting lever, of trip levers to actuate said brake setting lever, brackets carried by said automobile, said brackets normally supporting the free ends of said trip levers, a fender member arranged forwardly of said automobile, rods supporting said fender member and having their rear ends normally engaging with said levers whereby upon rearward movement of said rod, said levers will be actuated to operate said brake setting lever, means adjustably mounted on said bracket to automatically disengage said trip levers and said rods at a predetermined stage of movement of said trip levers, means for adjusting and retaining adjustment of said adjustably mounted means, and means to yieldingly resist rearward movement of said rods, as and for the purpose specified.

8. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, means for retarding the initial movement of said rod, means for overpowering the first said means and accelerating movement of said rod, means for breaking the operative relation of said rod relative to said connection and allowing said rod to continue its movement independently of said connection, and means for varying the time of breaking of said operative relation.

9. A combined automobile guard and controller comprising a buffer member disposed across the front of the automobile, a rod mounted to slide rearwardly and connected to said buffer member, a lever for controlling the travel of the automobile, a connection operable by said rod so as to automatically turn said lever during rearward movement of said rod, means for retarding the initial movement of said rod, means for overpowering the first said means and accelerating movement of said rod, means for breaking the operative relation of said rod relative to said connection and allowing said rod to continue its movement independently of said connection, means for adjusting the last said means so as to time the breaking of said operative relation, and means for securing the adjusting means in adjusted position.

In testimony whereof we affix our signatures in presence of two witnesses.

RATHUR H. AARON.
EDGAR A. TEETER.

Witnesses:
MARY B. ECKERT,
BRYAN H. OSBORNE.